United States Patent [19]

Kaneda

[11] Patent Number: 5,474,042
[45] Date of Patent: Dec. 12, 1995

[54] ENGINE PRE-OIL DEVICE

[76] Inventor: Mitsuharu Kaneda, 2836 Carolina St., San Pedro, Calif. 90731

[21] Appl. No.: 440,540

[22] Filed: May 12, 1995

[51] Int. Cl.⁶ .................................................. F01M 5/00
[52] U.S. Cl. ........................................ 123/196 S; 184/6.3
[58] Field of Search ............................ 123/196 R, 196 S; 184/6.3, 6.4

[56] References Cited

U.S. PATENT DOCUMENTS

| | | | |
|---|---|---|---|
| 2,867,203 | 1/1959 | Easton et al. | 123/196 S |
| 3,425,404 | 2/1969 | Lamkin | 123/196 S |
| 4,112,910 | 9/1978 | Percy | 123/196 S |
| 4,377,374 | 3/1983 | Taylor | 184/6.3 |
| 4,825,826 | 5/1989 | Andres | 123/196 S |

*Primary Examiner*—Henry C. Yuen
*Assistant Examiner*—Erick Solis
*Attorney, Agent, or Firm*—John E. Halamka

[57] ABSTRACT

A pre-oil device which uses a positive release catch/latch to allow a spring loaded piston within a resevor chamber to provide oil to an engine before the engine oil pump reaches operational levels. The solenoid which is energized to initiate the pre-oil process incorporates a slip mounting of the core to the positive release catch/latch to enhance the performance of the release and conserve energy. The device also includes an air tight mounting allowing the user to introduce pressurized air to augment the spring loading of the piston during adverse conditions. A secondary piston may be mounted within the main piston. The secondary piston recedes into the main piston under high oil pressure but applies pressure to the oil system to compensate for low pressure of the engine oil system during reduction of speed of the engine and reduced engine oil pump performance.

7 Claims, 2 Drawing Sheets

ENGINE PRE-OIL DEVICE

TECHNICAL FIELD OF THE INVENTION

This invention relates to the art of lubrication of the internal moving parts of an engine and, more particularly, to an improved device for creating oil pressure at vital engine lubrication points immediately after the starter solenoid engages the engine. Even though part of the engine usually includes an oil pump, this pre-oiling occurs before the engine oil pump has the ability to bring the internal engine oil pressure up to operational levels at critical points.

BACKGROUND ART

Many attempts have been made to solve the problem of supplying oil to an engine under adverse conditions such as long periods of disuse of the engine, low ambient temperature, failure of internal oil pump, etc.

The solutions in the prior art provide a reservoir of oil in a chamber. The reserved oil is forced out of the chamber by a spring loaded piston held by a catch. This reserved oil is provided to critical engine points upon the release of a latch holding the catch. The initiation of this pre-oiling function is ABSOLUTELY DEPENDENT upon the disengagement of the catch from the latch. The latches taught to be used by the prior solutions involve the pulling of the latch from engagement with the spring loaded catch. Thus, the normal static coefficient of friction between the latch and catch is increased by the spring loading of the latch no matter how long the engine has been idle. The pressing of a latch to the catch as taught by the prior art may result in a partial bonding of the parts or at least contribute an additional element of force which must be overcome before the catch is released from the latch.

Further, the prior art teaches that a spring loading of the piston is sufficient to overcome the viscosity of the reserved oil in the chamber even under adverse environmental conditions.

U.S. Pat. No. 2,867,203 attempts to solve the problem by providing a latch/catch configuration in which a rounded latch engages a rounded catch. However, the coefficient of friction is independent of the size or shape of the contact surface. Further, both ends of the latch 25, not just the rounded end, must still overcome the additional friction caused by the spring compression holding the latch against the catch in order for the catch to be released. The release mechanism is a solenoid. The use of a solenoid introduces yet another degree of difficulty in that the pulling force generated by a solenoid is at its weakest when the core is positioned remote from the coil. Thus, some solutions require the solenoid to overcome the coefficient of static friction by withdrawing the core from its weakest attraction, most extended position. Either a large solenoid current must be supplied or a larger solenoid must be incorporated to practice the solutions taught by the prior art to overcome this initiation force.

U.S. Pat. No. 4,112,910 ('910) offers a solution which still requires the initiation of a solenoid at an extended position to move a tripping plate 49 and locking rollers 37 used as a latch in contact under spring loaded locking head 30 before the spring loaded piston of the device delivers oil in the chamber to the vehicle engine. '910 also teaches outfitting the device with a heater to raise the temperature of the oil to allow user to operate the device under changing environmental conditions. The incorporation of a heater requires even more energy to initiate starting of the vehicle and the addition of a heater could become a potential fire hazard should the oil heater malfunction.

Thus there has long been a need for an arrangement utilize a positive, minimal friction and minimal inertia release actuator to initiate a rise in oil pressure rather than a catch within latch release which must overcome a relatively high coefficient of static friction increased by using a spring loaded catch, especially after a long term of disuse.

Further, it is also desired that, in order to allow positive release of a spring loaded piston to initiate delivery of oil, the latch holding the piston be configured with the minimum of mass and without the need to pull the latch from contact with the catch.

Further, it is also desired that, in order to assure flow of the oil even in adverse environmental conditions, the device provide some variable compensation other than adding heat energy to the oil resevor.

Further yet, it is also desired to provide for low power initiation of movement of the catch to release the latch by means of a solenoid in order to compensate for a weak battery in any engine which has been sitting idle for a while.

Yet further, it is desired to provide a device which will react to the variations of oil pressure internal to the engine and provide a more even level of oil pressure to the critical parts of the engine.

DISCLOSURE OF THE INVENTION

Accordingly, it is an object of the present invention to provide an improved device which initiates an increase in oil pressure the moment the engine starter power is engaged.

It is another object to provide a release which operates without having to pull the latch from physical contact with the catch.

In the preferred embodiment, the pre-oil pressure piston is held at an armed position by the application of a ball and socket lock. The ball is supported in the socket in a position whereby the ball can engage a catch. The spring loaded piston is released by the simple task of withdrawing the support for the ball within the socket thereby causing the ball to drop completely into the socket. Upon the dropping of the ball, the catch is no longer touching any restraint. Therefore, the piston is free to move without the expenditure of any force to overcome a latch/catch contact point.

It is another object of the present invention to provide a supplemental means to increase the pressure urging the piston forward within the device to compensate for environmental variations which could include reduction of the ambient temperature. This boost is provided by allowing the user to increase the internal air pressure behind the piston coupled with appropriate seals to provide an air tight chamber.

It is yet another object to provide a solenoid coupling which allows easy movement at the start of the solenoid operation to assist in reducing the power and magnitude of the solenoid require to release the latch means and start the pre-oil process.

It is yet another object to provide a secondary oil piston within the main piston to react to changes in oil pressure by providing a reserve supply of oil under pressure in response to a drop in the oil pressure being maintained by the engine oil pump to avoid oil starvation.

BRIEF DESCRIPTION OF THE DRAWINGS

The above and other embodiments of the present invention may be more fully understood from the following detailed description, taken together with the accompanying drawing, wherein similar reference characters refer to similar elements throughout, and in which.

MODES FOR CARRYING OUT THE INVENTION

Figure 1:
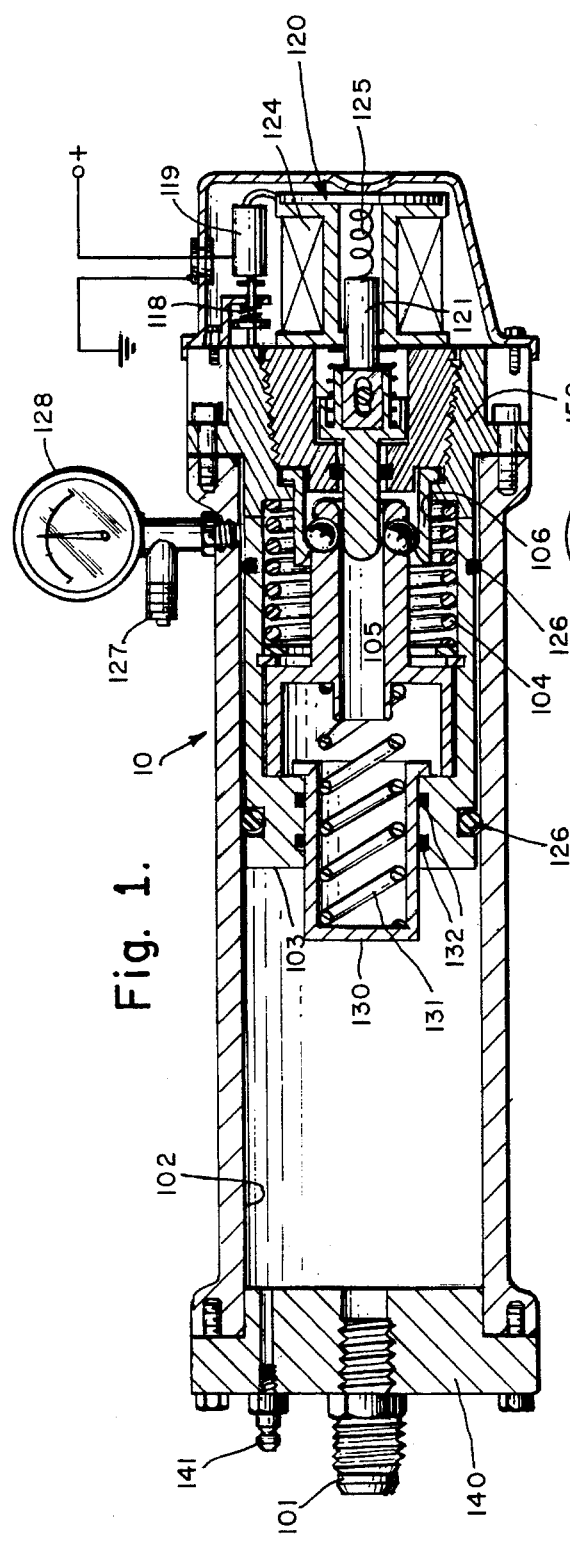
FIG. 1 is a crosssectional view of the device in the spring loaded and locked position.

Referring now to the drawing, FIG. 1 shows the device, generally designated 10, according to the invention.

The device 10 is mounted on an engine. The input/output port 101 is connected to the engine oil pathway at a preselected point after the engine oil pump and before the critical engine oil channels. It is desired that the oil pumped out of the device reach the critical engine points with a minimum of travel.

The device 10 supplies oil pressure immediately upon the electrical system of the starter for the engine being engaged. The main body 100 of the device 10 is generally cylindrical shaped. A top end cap 140 is mounted on one end of the body 100 and a bottom end cap 150 is mounted on the other end of the body 100. The engagement of the engine starter also supplies power to the solenoid 120 of the device 10 thereby releasing the latch 105 holding the main piston 103 of the device. The main piston spring 104 pushes the piston 103 against the oil held in the resevor chamber 102. The piston 103 is pushed toward the top end cap 140 of the device 10 thereby forcing oil out of the output/input port 101 to immediately supply oil to critical parts of the engine. After a time the engine oil pump creates internal oil pressure to support the oil requirements of the engine. As the device is attached to the internal oil channel, the internal oil pressure of the engine pushes oil into the chamber 102 of the device 10 and against the main piston spring 104 to fill the chamber 102 and move the main piston 103 to the bottom of the chamber 102. The movement of the piston stores energy in the main piston spring 104, fills the chamber 102 of the device 10 with oil and pushes the main piston 103 until the latch 105 is engaged to hold the main piston 103 in the bottom most, armed position.

Figure 3:
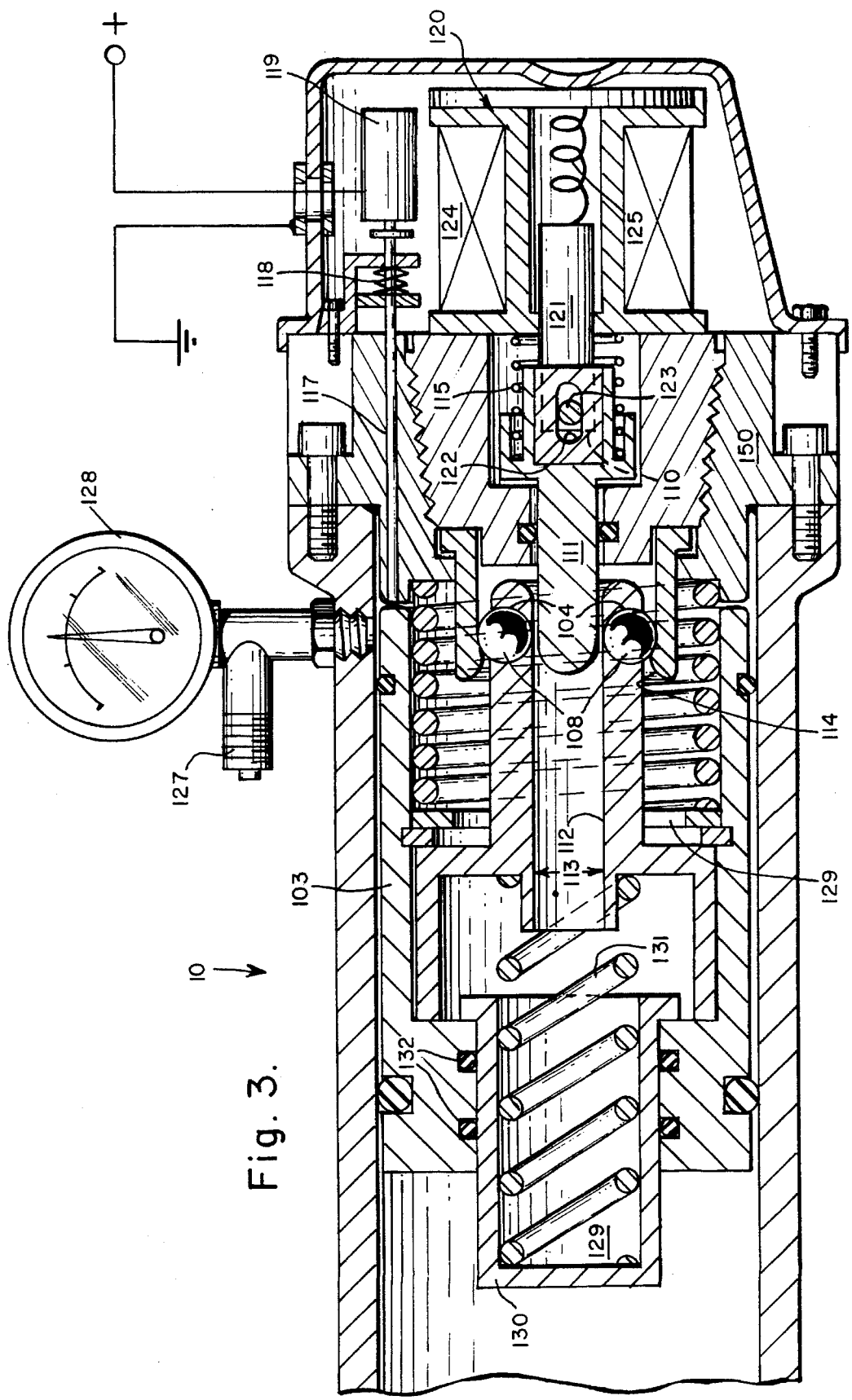

The latch means used in the preferred embodiment is illustrated in FIG. 3. The latch 105 is a modified ball and socket arrangement. A main piston retainer 112 having a central channel 113 and formed in a general cylindrical shape of a preselected diameter and a preselected thickness is mounted within the rear portion of the main piston 103. A plurality of lock ball channels 109 of a preselected diameter larger than the thickness of the main piston retainer 112 are formed the main piston retainer 112. This dimension is selected to allow the lock balls 108 to extend out of the lock ball channels 109 and engage the lock ball catch 106. A plurality of lock balls 108 of a diameter slightly smaller than the lock ball channels 109 are mounted, one within each lock ball channel 109 and held within by a C-ring 110. A push rod 111 insertable within the central channel 113 positions each lock ball 108 within the lock ball channel 109. The push rod 111 urges the lock balls 108 to a position whereby the lock balls 108 stick out of the lock ball channel 109 remote from the push rod 111.

A lock ball catch 106 formed generally as a cylinder of an inside diameter larger than the main piston retainer 112 is formed with a upper lip 114. Upon insertion of the main piston retainer 112 into the lock ball latch, the lip 114 pushes the lock balls 108 to a position within the lock ball channel 109 remote from the lip 114. The lock balls 108 then initially move the push rod 111 toward the bottom cap 150 until the lock balls 108 clear the lip 114. The push rod 111 is then urged forward by the push rod spring 115 to position the lock balls 108 within the lock ball channels 109 remote from the push rod 111 thereby engaging the bottom of the lip 114 and holding the main piston retainer 112 in a latched position.

The end of the push rod 111 remote from the lock balls 108 is formed with an internal channel 116 to allow slip mounting of the push rod 111 to the core 121 of the solenoid 120. A slip channel 122 is formed at the end of the core 121. The core 121 is inserted into the internal channel 116 of the push rod 111 and urged therein by the core spring 125. The slip pin 123 is mounted in the base of the push rod 111 and engaged within the slip channel 122. The initial rearward movement of the core 121 upon energizing the winding 124 of the solenoid 120 does not move the push rod 111. Only upon the slip channel 122 moving rearward enough to engage the slip pin 123 is the push rod 111 moved. This slip mounting is used to allow the solenoid 120 to initiate movement of the core 121 with low power to overcome the inertia of the core 121 even at the extended position of the core 121 and without having to overcome the inertial of the combined mass of the core 121 and push rod 111. After movement of the core 121 is initiated and the core 121 engages the push rod 111 through slip pin 123, the continued application of power to the winding 124 attracts the core 121 within the winding 124. This slip arrangement allows the use of a lower power winding 124 for the solenoid 120 and lower power drain for the engine battery on starting.

As the push rod 111 is withdrawn from the main piston retainer 112 by the solenoid 120, the lock balls 108 are allowed to drop into the lock ball channels 113 away from the lip 114 of the lock ball catch 106 thereby releasing the main piston retainer 112 and the main piston 103 for initiation of the pre-oil function described above.

Upon release of the main piston 103, microswitch rod is urged forward by microswitch rod spring 118 thereby releasing the microswitch 119 and removing energizing power from the solenoid 120. This microswitch arrangement saves power from being continuously applied to the winding 124 of the solenoid 120 until the main piston retainer 112 is re-engaged with the lock ball catch 106 whereby the main piston 103 pushes on the microswitch rod 117 allowing the microswitch 119 to be placed in the ON position. As soon as energy is applied to the engine starter, energy flows through the microswitch 119 and energizes the winding 124 of the solenoid 120 to again initiate the pre-oil function as described above.

Figure 2:
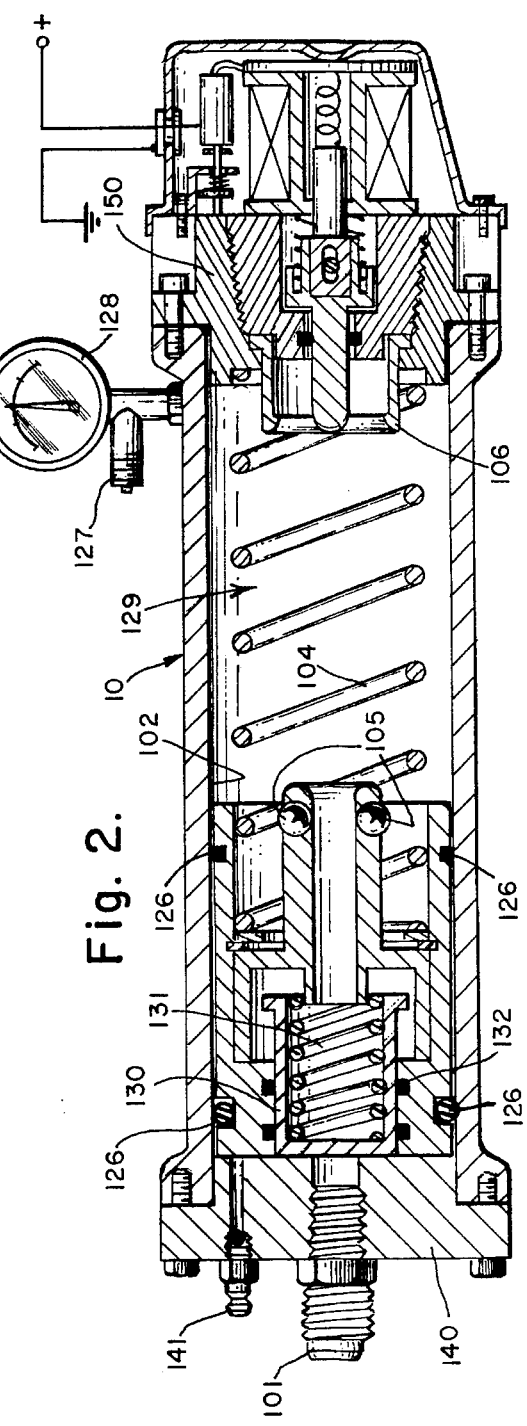
FIG. 2 is a crosssectional view of the device in the fully extended position; and, FIG. 3 is an expanded crosssectional view of the bottom end of the device.

FIG. 1 illustrates a secondary piston 130 mounted within the main piston 103. A secondary piston spring 131 urges the secondary piston 130 to its extended position as shown. FIG. 2 illustrates how the secondary piston 130 slides into the main piston 103 under the condition of the main piston 103 being urged by the main piston spring 104 to the top end of the chamber 102. The stiffness coefficient of the secondary piston spring 131 is selected to allow the depression of the secondary piston 130 into the main piston 103 under the condition of the engine oil pump delivering oil under pressure through the input/output port 101. The depression of the secondary piston 130 performs two functions.

First, the depression allows more oil to fill the chamber 102.

Second, under the condition of the main piston 103 being latched in the armed position, the secondary piston 130 is free to move in and out of the main piston 103 to react to changes in oil pressure during the operation of the engine.

This reaction of the secondary piston 130 aids in normalizing the internal oil pressure of the engine by providing a smoothing out of variations in oil pressure due to changes in engine speed.

The mounting of the secondary piston 130 within the main piston 103 includes a plurality of secondary piston O-rings 132.

The mounting of the main piston 103 within the chamber 102 also includes a plurality of main piston O-rings 126.

The purpose of the O-ring mountings, 126 and 132, is to provide an air tight chamber 129 behind the main piston 103.

An air pressure input 127 and an air pressure gage 128 are mounted on the body 100 of the device 10 to communicate with the air tight chamber 129. A source of pressurized air may be coupled to the air pressure input 127 and the air pressure inside the air pressure chamber 129 may be increased to a preselected pressure as indicated by the reading of the air pressure gage 128. This increased pressure within the air pressure chamber 129 assists the main piston spring 104 in urging the main piston 103 toward the input/output port 101 under the condition of the lock ball catch 106 of the main piston retainer 112 being released. This increased pressure may be useful under the condition of low ambient temperature which may decrease the viscosity of the oil held within the chamber 102.

An air bleed screw 141 is mounted on the top end cap 140 to communicate with the chamber 102.

Upon initial installation and periodically during the servicing of the device 10, the user should open the air bleed screw 141 to remove any accumulation of air within the chamber 102. In order to facilitate this maintenance service, the device 10 should be mounted on the engine in a position accessible by the user and in an orientation in which the air bleed screw 141 is at the up most point to allow any accumulated air to be released.

Since certain change may be made in the above apparatus without departing from the scope of the invention herein involved, it is intended that all matter contained in the above description, as shown in the accompanying drawing, shall be interpreted in an illustrative, and not a limiting sense.

What is claimed is:

1. A pre-oil arrangement adapted for mounting on an engine having a starter and communicating with the engine oil system at a point between the engine oil pump and the critical items of the engine which require oil, and comprising, in combination:

a body, shaped generally as a hollow cylinder and having a top end cap and a bottom end cap forming a chamber;

a input/output port mounted in said top end cap for communicating said chamber with said engine oil system;

a main piston mounted within said body;

a main piston spring which urges said main piston toward said input/output port;

a ball and socket latch means which engages and maintains said main piston in a spring loaded position near said bottom end cap thereby allowing oil from said engine to fill said chamber;

a ball and socket latch release means activated upon initiation of said engine starter whereby said ball and socket latch means is positively released allowing said main piston to provide oil under pressure into said engine oil system.

2. The arrangement defined in claim 1 wherein:

said ball and socket latch release means includes a solenoid having a core slip mounted to said release means whereby under the condition of activation of the engine starter, said solenoid starts movement of said core for a preselected distance before engagement of said ball and socket latch release.

3. The arrangement defined in claim 2 wherein:

said ball and socket latch includes a push rod slip mounted to said core, said push rod supporting balls within said socket until said push rod is withdrawn upon the activation of said solenoid and movement of said core whereby said balls fully fall into said socket and said main piston is disengaged from its position near said bottom end cap.

4. The arrangement defined in claim 1 wherein:

said main piston spring loading may be enhanced by an air pressure assist comprising;

a plurality of O-ring air tight mounts for said main piston within said body forming an air tight chamber between said main piston and said bottom end cap;

an air pressure input mounted on said body and communicating with said air tight chamber whereby a user may increase the pressure within said air tight chamber to further urge said main piston toward said top end cap.

5. The arrangement defined in claim 4 further comprising a pressure gage indicating the air pressure within said air tight chamber.

6. The arrangement defined in claim 1 further comprising an air bleed screw mounted in said top end cap at a position accessible to a user to allow the release of accumulated air within said chamber.

7. The arrangement defined in claim 1 further comprising:

a secondary piston air tightly mounted within said main piston;

a secondary piston spring of preselected spring constant and mounted to urge said secondary piston from within said main piston toward said top end cap whereby the oil pressure of said engine is maintained at a more constant level due to the secondary piston providing oil under pressure to said input/output port.

* * * * *